United States Patent [19]
Fischer

[11] 4,195,568
[45] Apr. 1, 1980

[54] BEARER RING - PRINTING PRESS CYLINDER ALIGNMENT AND CONNECTION CONSTRUCTION FOR ROTARY PRINTING MACHINES

[75] Inventor: Hermann Fischer, Augsburg, Fed. Rep. of Germany

[73] Assignee: Maschinenfabrik Augsburg-Nürnberg Aktiengesellschaft (M.A.N.), Augsburg, Fed. Rep. of Germany

[21] Appl. No.: 962,395

[22] Filed: Nov. 20, 1978

[30] Foreign Application Priority Data

Nov. 30, 1977 [DE] Fed. Rep. of Germany ....... 2753284

[51] Int. Cl.[2] .......................... B41F 5/00; F16C 23/00

[52] U.S. Cl. ...................................... 101/216; 308/62; 308/237 R; 308/57; 308/DIG. 11

[58] Field of Search ........................ 101/212, 216, 217; 308/40, 41, 20, 56, 62, 37, 237 R, 237 A, 239, DIG. 11, 53, 57; 129/148.1

[56] References Cited

U.S. PATENT DOCUMENTS

| | | | |
|---|---|---|---|
| 510,118 | 12/1893 | Clayton | 308/62 |
| 1,998,888 | 4/1935 | Wallgren | 308/237 R |
| 2,879,112 | 3/1959 | Cox | 308/237 R X |
| 3,020,100 | 2/1962 | Smith | 308/56 |
| 3,326,439 | 6/1967 | Sarka | 101/216 X |
| 3,572,173 | 3/1971 | Woltjen | 308/62 X |
| 3,625,145 | 12/1971 | Heatley, Jr. et al. | 101/216 X |
| 4,054,341 | 10/1977 | Spieth | 308/237 R |

FOREIGN PATENT DOCUMENTS

| | | | |
|---|---|---|---|
| 549977 | 12/1957 | Canada | 308/237 A |
| 1807059 | 9/1970 | Fed. Rep. of Germany | 308/62 |

*Primary Examiner*—E. H. Eickholt
*Attorney, Agent, or Firm*—Frishauf, Holtz, Goodman & Woodward

[57] ABSTRACT

To permit slight tilting adjustment of a bearer ring with respect to the shaft of an associated printing cylinder upon interposition of a layer of resilient, shock-absorbent, wear-resistant material between the shaft and the shaft-receiving opening of the bearer ring, and to allow for inaccuracies of fit due to this elastic insert, the bearer ring is formed with openings therethrough in alignment with similar openings formed in the end face of the associated cylinder, exact positioned alignment between the bearer ring and the printing cylinder being obtained by introducing adjustment pins through these openings, the adjustment pins having relatively eccentrically offset sections in the bores of the bearer ring and the printing cylinder so that, upon rotation of the eccenter pins, exact concentricity of the bearer ring and the printing cylinder can be obtained.

8 Claims, 2 Drawing Figures

Figure 1:
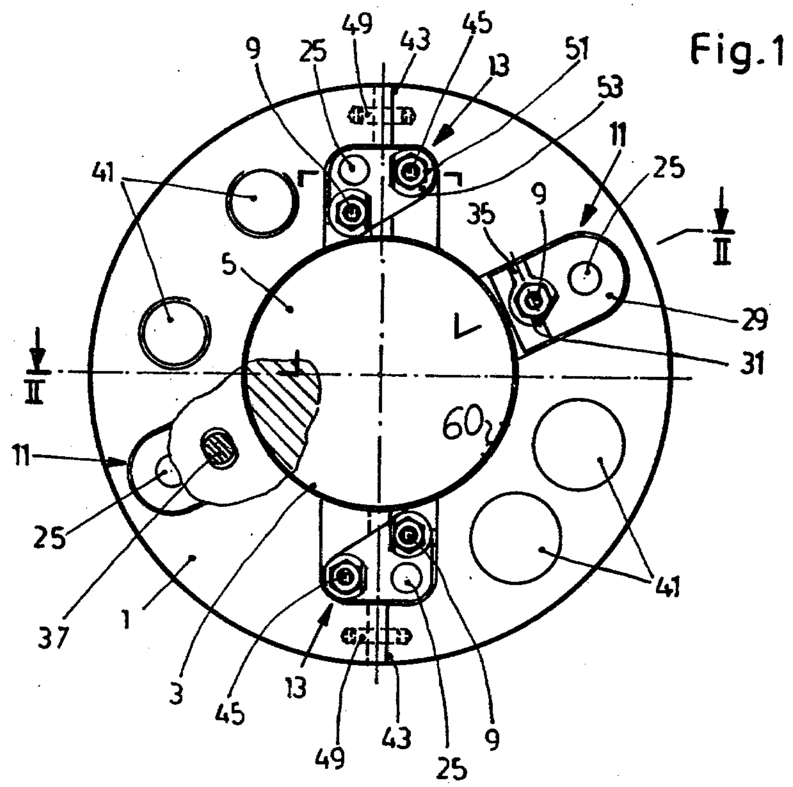

BEARER RING - PRINTING PRESS CYLINDER ALIGNMENT AND CONNECTION CONSTRUCTION FOR ROTARY PRINTING MACHINES

Reference to related application:

U.S. Ser. No. 962,344, filed Nov. 20, 1978, FISCHER, (claiming priority of German Application P 27 53 296.3 of Nov. 30, 1977;) assigned to the assignee of the present application.

The present invention relates to rotary printing machines, and more particularly to an arrangement to provide for the connection of bearer rings or cylinder bearers with associated respective printing press cylinders which provide for accurate alignment of the concentricity of the respective bearer ring and cylinder.

BACKGROUND AND PRIOR ART

Printing press cylinders are customarily provided with bearer rings which are positioned at the outer end faces. The bearer rings of adjacently located printing cylinders roll off with respect to each other. They are maintained under constant biassing force against each other and determine the nip between the associated printing press cylinders.

It is desirable to cushion shocks which arise in the operation of rotary printing presses. U.S. patent application No. 686,807, filed Jan. 12, 1978, Fischer, to which corresponds:German Patent Disclosure Document 27 01 670, assigned to the assignee of present application, discloses an elastic connection between a bearer ring and the shaft of the associated printing cylinder. The elastic connection is formed as an elastic inner ring which is provided to absorb shocks and impacts which may occur if, for example, the two bearer rings which roll off against each other should separate during the roll-off operation. Such separation may occur, for example, because a rubber blanket is slightly too thick, paper, dust or lint builds up on the rubber blanket, or the rubber blanket forms a bead upon roll-off against an associated cylinder, so that, when the rubber blankets rotate, the bearer rings are subjected to impacts or concussions against each other as the blanket clamping grooves pass under the contact line. The pounding or impact forces which are applied against the bearer rings are considerable. The elastic, shock-absorbing cushioning layer is provided to decrease wear and tear on the bearer rings.

Elastically mounting the bearer rings is effective to reduce the shock forces acting on the bearer rings. Introducing an elastic layer between the shaft of the cylinder and the bearer ring requires accurate manufacture thereof, or accurate casting of an elastic compound between the shaft and the bearer ring. If the concentricity between the shaft and the bearer ring is not perfect, deviations in the roll-off characteristics of the bearer rings and the bearer rings and the associated cylinders will additionally result, which may cause further pounding forces. It is also difficult to maintain such bearer rings, or prevent continued damage thereto if some slight damage, due to pounding forces, is noticed initially.

THE INVENTION

It is an object to provide a connection arrangement between a bearer ring and the associated end face of a printing cylinder, so that the bearer ring-printing cylinder connection can be accurately aligned and adjusted to provide for minimum damage to the bearer rings in operation, in spite of the presence of pounding forces.

Briefly, both the bearer rings as well as the end faces of the associated printing cylinders are formed with at least three matching aligned openings, positioned circumferentially around the shaft and passing through the bearer ring. Matching pins are inserted through the bearer rings and into the openings in the end faces of the cylinders. The pins have a first shaft portion fitting into the opening of the bearer ring, and a second shaft portion eccentric with respect to the first one and fitting into the opening in the printing cylinder. By rotating the pins, for example by a wrench applied to an outside squared-off portion of the pins, the cylinder and the bearer rings can be accurately aligned in position with respect to each other.

The bores are so located that they are not on one straight line. Preferably, locking means in the form of a link plate are arranged adjacent the pins so that they can be arrested in locked position and, additionally, their rotation within the bores of the bearer rings can be accurately guided.

The arrangement has the advantage that the eccenter pins, by rotation thereof, permit accurate alignment of concentricity of the bearer rings with respect to the associated printing cylinders, by affording the necessary radial correction to compensate for possible inaccuracies in positioning of the bearer rings, or in the manufacture of the elastic interposed layer material.

A locking arrangement for the bearer pins which uses the preferred connecting plate with an associated parallel pin has the additional advantage that tilting of the eccenter pins is preventing, thus in turn preventing uncontrolled inclination of the bearer ring with respect to the associated printing cylinder, and thereby preventing possible decrease in the load carrying or bearing capacity of the bearer ring.

Frequently, bearer rings are made in various parts, typically split into radial halves, in order to permit easier disassembly and replacement of the bearer rings. The guide pin to guide the eccenter pin can be used in connection with such a clamping arrangement by associating a further eccenter pin therewith. In accordance with a feature of the invention, the bearer ring is formed with a further bore immediately adjacent the bore of the guide pin, but located on another half portion of the bearer ring. A part-eccentric pin is then passed through this further bore to permit alignment of the respective halves of the bearer ring, with respect to each other, upon rotation of the further eccenter pin in the bore of the bearer ring and in an essentially matching bore of the connecting plate or link.

Bearer rings sometimes do not operate in exact parallel-axial relationship with respect to each other. From time to time, bearer rings rolling off against each other do not contact each other over their entire width, but only at a relatively narrow edge portion. This decrease in the bearing width of the bearer rings substantially increases the loading for a specific area, so that the design or calculated or permitted loading of the bearer rings is substantially exceeded. Reference may be had to "Druckmaschinen-Nachrichten" No. 63, pages 3 to 23 ("Printing Machinery News").

If the inner ring of the bearer ring connection to the shaft is slightly elastic, the bearer ring can assume a somewhat inclined position—to a slight extent only, of course—so that the carrying surface of the bearer rings with respect to each other will match, and will be increased to the desired width of the bearer ring. This substantially decreases damage to the bearer rings since the loading on the bearer rings is now equalized over its entire width. In accordance with a further embodiment of the invention, the connection between the bearer rings and the associated printing cylinder permits slight deviation of coplanar position of the end face of the printing cylinder and the bearer ring if the portion of the eccenter pins which is introduced into the printing cylinder is slightly spherical, or outside axially rounded. The bearer rings can then self-align themselves with respect to each other as they roll off against each other.

Damage to bearer rings can sometimes be noted a substantial period of time before it becomes serious by microscopic markings on the surface of the bearer ring, or by noting vibration in operation. Such bearer rings can be continued in use for a substantial period of time if the damaged areas are shifted circumferentially with respect to the associated printing cylinder, so that the circumferential regions which have been damaged are no longer subjected to the cyclically recurring pounding forces; rather, undamaged surface zones of the bearer rings will now be in contact with each other. Tangential shifting, in accordance with a feature of the invention, is obtained by forming the openings or bores in the end face of the printing cylinder as part-circular, elongated openings in which extend concentrically with respect to the shaft of the printing cylinder in the end face of the respective printing cylinder.

Damage to the bearer rings, after some operating time, will occur not only on the running surface thereof but also in the central bore where the bearer ring fits on the shaft of the associated printing cylinder. Damage may also result to the shaft itself. Such damage is caused by the friction or fitting corrosion which arises due to possibility of suitable lubrication and constant micro-movement between the shaft and the bearer ring. If repairs to the bearer rings are needed, for example to repair a cylinder shaft damaged due to such corrosion and to replace the bearer ring with a new bearer ring, then, in accordance with a feature of the invention, the new bearer ring is so made that its internal groove is offset with respect to the bearer ring previously used, so that undamaged regions of the shaft will come in contact with the new bearer ring.

Pounding and impact forces arising in operation, and causing continued damage to the bearer ring can readily be measured by introducing a pressure measuring device within the elastic inner ring which can determine if permitted or design values of loading are exceeded, so that excessive forces will be detected before they will act on the bearer rings for such a period of time that the bearer rings will actually be damaged.

Figure 2:
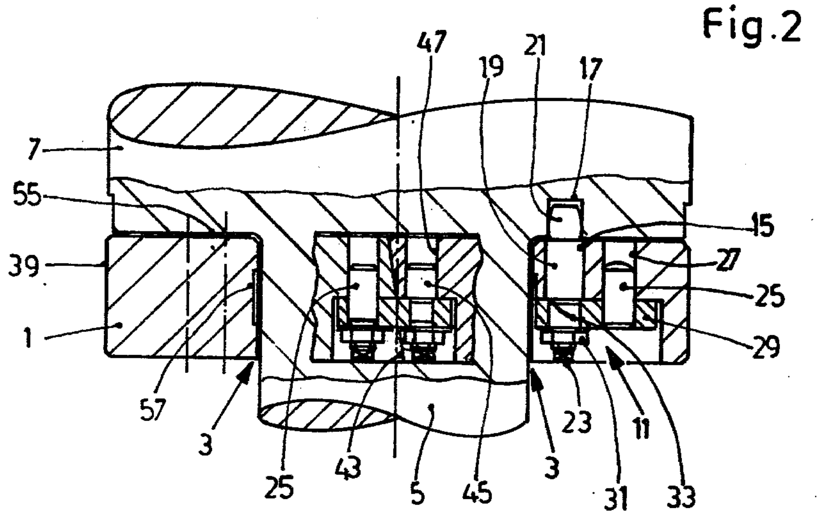

Drawings, illustrating a preferred example, wherein:

FIG. 1 is an end view of the bearer ring, with parts broken away, in schematic form, omitting features not necessary for an understanding of the present invention; and FIG. 2 is a section along the angled section line II—II of FIG. 1, in which the section line passes from the left to the center of FIG. 1 and then upwardly at an angle, the shaft being partly broken away to show portions at the far side thereof.

A bearer ring 1 (FIG. 1) has a central bore. It is mounted on a shaft 5 by means of an elastic shock-absorbent insert layer 3 surrounding the shaft 5. Shaft 5 is secured to a printing cylinder 7. The inner ring 3 can be made of reinforced cardboard, Teflon, particularly a PTFE foil, a PIV foil, or similar wear-resistant, shock-absorbent material. It can be inserted as a layer ring, or the bearer ring 1 and the shaft 5 can be constructed to have sufficient clearance so that the material can be cast in a gap formed between the central bore of ring 1 and shaft 5.

The inner elastic layer 3 is used to elastically accept pounding forces transferred to the bearer ring 1 when the bearer ring rolls off on a similar bearer ring located at an adjacent printing cylinder. These pounding forces are resiliently accepted and balanced, and distributed throughout the circumference of the shaft. The elastic insert also permits slight tilting of the bearer ring about the shaft, that is, about an axis perpendicular to the plane of the drawing of FIG. 2. Such tilting permits the bearer ring 1 to adjust its position with respect to the circumference of an associated engaging bearer ring, due to inaccuracies in positioning, bend-through of the shaft of either one, or both, of the printing cylinders, or the like. This matching fit of the bearer rings against each other then permits engagement of associated bearer rings over the full engagement area or line, so that the full support area or line of the bearer rings, as determined by the design, can be utilized.

The elastic inner layer or ring 3 frequently cannot be applied to the shaft 5, with reasonable manufacturing costs, such that the bearer ring 1 and the shaft 5 of the printing cylinder 7 are precisely concentric. The bearer ring 1 is connected to the associated printing cylinder by means of a plurality of eccentric pins 9. These pins 9 are located in two or three-part lock arrangements 11, 13, respectively, passing first through a first bore 15 through the end face of the bearer ring 1 into a second bore 17 formed in the end face of the associated printing cylinder 7. The bores are in essential alignment. The portion of the shaft 19 of any one of the eccenter pins which is located in the first bore is eccentric with respect to the portion 21 located in the second bore 19 in the associated printing cylinder. Upon rotation of the pin 9, for example by a wrench applied to the head of the pin 9 at a square or other suitable end 23 thereof, the bearer ring 1 can be shifted slightly with respect to the printing cylinder 7, essentially in radial direction, when the eccentric portions of the two shaft portions 19 and 21 are suitably oriented.

Preferably, three or four such eccentric pins are located in the end face of the bearer ring and the respective printing cylinder, positioned such that they are located along a circumferential ring, for example, but in any event such that not all the adjustment pins are located in a single straight line.

Locks 11, 13 are so arranged that a guide pin 25 can be passed into a third bore 27 formed in the end face of the bearer ring 1. These guide pins prevent shift of position of the eccenter pin 9 upon rotation thereof; the bearer ring 9 is thus held in precise alignment with the associated hole in the bearer ring, and prevents possible tilting of the bearer ring with respect to the printing cylinder into a fixed, predetermined tilted position. The locks 11, 13 include, each, a connecting plate; connecting plate 29 is shown at lock 11. The connecting plate is formed with a bore for the guide pin 25 and with an additional bore for the eccenter pin 9. In a preferred form, the first portion 19 of the eccenter pin 9 is concentric with the major shaft portion thereof, and the second shaft portion 21 is eccentric with respect thereto—see FIG. 2.

The eccenter pin 9 is secured against undesired or random rotation by nut 31 which, when tightened against the lock plate 29, presses a flange or abutment 33 against the lock plate 29; a holding strip 35, which has a bent-over edge, is placed beneath the nut to bear against a flat surface thereof to prevent rotation of the nut after tightening.

The second shaft portion 21 of the eccenter pin 9, seated in bore 17 of the printing cylinder 7, preferably is formed with a spherical end portion in order to permit slight tilting of the bearer ring 1 to fit the circumferential position of the associated bearer ring rolling off thereagainst. In a preferred form, the opening or bore formed in the printing cylinder 7 is formed as an elongated opening, concentric with the center of the shaft 5, as seen at 37, FIG. 1. This elongated opening permits slight circumferential adjustment of the bearer ring after some operating time if indications of wear or damage at the surface thereof become apparent. If the surface 39 of the bearer ring is damaged at any one position, shifting of the bearer ring circumferentially by a small degree, that is, tangentially, can place portions of the bearer ring in engaging contact with an associated bearer ring which are still undamaged, so that any damage to a bearer ring which is incipient can be prevented by placing an undamaged position of the bearer ring 1 in contact with the associated position of an associated adjacent bearer ring.

Radial correction of non-concentric condition of the bearer ring 1 and the inner ring or layer 3 can be effected by three pins 9 located in three locks of the dual-lock type shown at lock 11, provided the three locks are not positioned along one straight line. They may, for example, be positioned 120° apart. The only requirement is that the three locks have different effective vectorial directions of adjustment. Most bearer rings already have openings 47 therein; to match already existing openings and to facilitate adjustment, it is preferred, however, to use more than three adjustment arrangements, for example to use four, as shown in FIG. 1, angularly arranged, for example, as shown. Using four locks permits placing two of them in one diametrical straight line which can be used to permit adjustment of split bearer ring halves with respect to each other.

Many bearer rings are split in half; FIGS. 1 and 2 show a diametrical gap 43, permitting separation of the bearer ring into two halves and replacement or repair without disassembly of the associated printing cylinder from the bearing in which it is journalled. By suitable positioning of locks 13 which have three parts therein, correction not only in radial direction but also with respect to tangential matching of two bearer ring halves can be easily effected with essentially the same elements. The lock elements 13 are provided with an additional eccenter pin 45 located at the other side of the separating gap 43 with respect to the first pin 9, that is, engaging the other half of the bearer ring portion. The eccenter pin 45 is engaged in a fourth opening 47 in the bearer ring 1 and rotatable within the associated connecting link or plate 29. Upon assembly together of the two bearer ring halves, and rough connection by two bolts 49, rotation of the second eccenter pin 45 then permits tight engagement of the rings against each other and additionally adjustment of the rings with respect to each other in radial direction so that a smooth circumference will be presented to the bearer ring of the next adjacent cylinder. The connection between the bearer rings themselves will not be affected by subsequent rotation of the eccenter pin 9, since the guide pin 25 will define the position of the eccenter pin 45 with respect thereto, and hence the position of the two bearer ring halves with respect to each other. The eccenter pin 5 is held against rotation by a nut 51, secured in position by a bent-over plate 53.

An elastic disk, shim, or washer plate 55 is preferably inserted between the bearer ring 1 and the engaging end face of the associated cylinder 7. The washer or disk 55 is made of shock-absorbent, wear-resistant, elastic material which, and preferably, is similar to that of the material of the elastic insert layer 3. The washer or disk 55 facilitates fitting of the bearer ring 1 against the end face of the cylinder and additionally permits slight tilting adjustment, for example self-aligning floating adjustment of the bearer ring 1 with respect to the end face of the cylinder 7.

The central bore of the bearer ring 1 is formed with a groove or recess 57 which, preferably, extends about over half of the bearing region of the bore. After long operation of the bearer ring, corrosion may occur on the shaft 5. Replacement of the shaft can be avoided if a bearer ring is then placed on the shaft in such a position that the location of the recess 57 is shifted so that the bearing portion of the bearer ring will be placed at a location on the shaft 5 at which the shaft 5 is still undamaged.

The elastic inner ring 3 can be made of suitably thickness—not shown in the drawings for better illustration—and pressure sensitive measuring instruments 60, only one of which is shown in FIG. 1, can be embedded therein or located within the region of the layer 3. Such pressure sensitive instruments are preferably distributed over the circumference of the shaft 5. These pressure sensitive measuring devices, for example, are piezoelectrical sensors, as well known in the art, which provide output signals representing loading on the shaft so that excessive loading of the bearer ring can be signalled before the assembly is damaged.

Various changes and modifications may be made within the scope of the inventive concept.

I claim:

1. In a rotary printing press a bearer ring (1)—printing press cylinder (7) connection construction, in which the bearer ring (1) is mounted on a shaft (5) of the cylinder, positioned against an end face of the cylinder, the shaft passing through the bearer ring, and having an elastic, shock-absorbent, wear-resistant layer (3) interposed between the shaft (5) and the bearer ring, and comprising, in accordance with the invention, at least three connection pins (9) having a first shaft portion (19) and a second shaft portion (21), the second shaft portion being eccentric with respect to the first shaft portion;

at least three first bores (15) formed in the end face of the bearer ring (1) and extending therethrough essentially parallel to the axis of the shaft;

and at least three second bores (17) essentially matching, and in alignment with, the first bores and extending inwardly of the printing press cylinder (7) from the end face thereof against which the bearer ring is positioned, the pins (9) extending through said bores, the first shaft portion (19) of the pins being positioned in said first bores of the bearer ring and the second shaft portion in the second bores of the cylinders, to permit relative adjustment of the position of the bearer ring with respect to the cylinder upon rotation of said pins.

2. Construction according to claim 1, further including a guide element (29) positioned against the end face of the bearer ring remote from the face bearing on the cylinder, the guide element (29) being formed with at least two openings, the first portion (19) of the pin (9) passing through one opening therethrough;

third bores (27) formed in the end face of the bearer ring adjacent said first bores (15);

and guide pins (25) inserted through the opening of the guide element (29) and into the third bores of the bearer ring to provide for guidance and secure alignment of the first portion of the eccentric pins (9) in said first and second bores.

3. Construction according to claim 2, in which the bearer ring is formed in two bearer ring portions separated by a radially extending gap (43);

at least one of said second bores in the cylinder being located in the vicinity of said gap;

a fourth bore (47) located in the vicinity of said second bore in the other portion of said bearer ring;

a second eccentric pin (45) introduced in said fourth portion;

and said guide element (29) extending over said first, third and fourth bores and being formed with an opening matching, and in alignment with, said fourth bore to receive said second eccentric pin (45) therein.

4. Construction according to claim 1, wherein the second portion (21) of the pins and engaging in the second bore (17) of the printing cylinder has an essentially part-spherical outer circumference.

5. Construction according to claim 1, wherein the second bores (17) in the end face of the printing cylinder (7) are formed as elongated openings extending in circumferential direction concentric with the axis of the shaft (5) of the respective cylinder to permit circumferential adjustment of the position of the bearer ring with respect to the associated cylinder.

6. Construction according to claim 1, further including a cushioning disk or washer (55) made of elastic, shock-absorbent material interposed between facing end surfaces of the bearer ring (1) and of the cylinder (7).

7. Construction according to claim 1, wherein the central bore of the bearer ring (1) is formed with a recess (57) therein extending at least partly around the circumference thereof.

8. Construction according to claim 1, further including a pressure measuring device (60) located within the elastic layer of shock-absorbent material (3) separating the shaft (5) and the central opening of the bearer ring (1) receiving said shaft.

* * * * *